Aug. 6, 1963
R. KORPMAN
3,100,160
TAPE EMPLOYING AN ADHESIVE COMPRISING AN
EPOXY RESIN AND A POLYMER HAVING
CARBOXYLIC GROUPS
Filed April 29, 1959
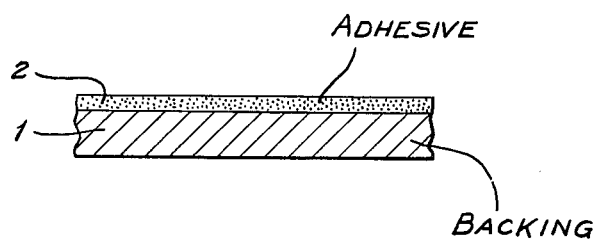
INVENTOR.
RALF KORPMAN
BY
Morgan, Finnegan, Durham & Pine
ATTORNEY United States Patent Office 3,100,160
Patented Aug. 6, 1963

3,100,160
TAPE EMPLOYING AN ADHESIVE COMPRISING AN EPOXY RESIN AND A POLYMER HAVING CARBOXYLIC GROUPS
Ralf Korpman, East Brunswick, N.J., assignor to Johnson & Johnson, a corporation of New Jersey
Filed Apr. 29, 1959, Ser. No. 809,709
6 Claims. (Cl. 117—122)

This invention relates to water-insoluble, normally tacky and pressure-sensitive adhesive compositions and tapes employing such adhesives. More particularly, this invention relates to water-insoluble, normally tacky and pressure-sensitive adhesives having improved hold, solvent resistant and high temperature stability characteristics, and to tapes employing such adhesives.

Conventional normally tacky and pressure-sensitive adhesives are compounded from a composition including an elastomeric component, which is usually a natural or synthetic rubber or similar elastomeric polymer, and a solid resinous component compatible with the rubber and adapted to impart tack to the adhesive composition, together with suitable amounts of various types of additives such as conventional fillers, anti-oxidants, etc. The elastomeric component, tackifying resin, and fillers, when used, are proportioned to obtain in the adhesive properties of high internal strength and cohesiveness and high adhesiveness. High cohesive characteristic of the adhesive is required so that the tape with the adhesive shall remain firmly attached to the surface to which it has been applied and not fail because the adhesive is too weak and splits leaving part on the tape and part on the surface to which it was applied. The adhesiveness of the composition must be such that good adherence of the composition to the surface to which it is applied is secured with normal finger pressure.

The adhesiveness of such a composition can be considered threefold in characteristics. In the first instance, the adhesiveness of such a pressure-sensitive composition can be related to the ability of the adhesive to secure itself quickly to the surface to which it is applied. This characteristic can be determined by a procedure which involves touching the adhesive surface of a loop of tape to a suitable surface and measuring the force required to immediately remove the tape from the surface. Such adhesiveness is conventionally expressed as "tack" or "quick stick" in units of grams per unit width of tape. Adhesiveness may be expressed as the force necessary to remove an adhesive coated tape from a surface to which it has been applied. This measurement is called the adhesion or "peel" adhesion. It is generally referred to in oz./inch width when stripped at a rate of 6″/min. The adhesiveness can also be expressed as the characteristic of the adhesive to resist removal of the tape from a surface to which it is applied when subjected to a static load which tends to shear the adhesive mass. In conventional test procedures, this characteristic of a pressure-sensitive adhesive is often determined by suspending a fixed weight from an end of a length of pressure-sensitive tape, a fixed area of the other end of which is adhered to a suitable surface. The weight is suspended in a manner which exerts a shearing force upon the adhesive at a suitable removal angle as, for example, 0°, 20°, 90°, etc. The length of time until the weight drops is taken as an index of an adhesiveness characteristic of the adhesive mass under test and its resistance to shear, and this characteristic is defined as the "hold" characteristic of the adhesive. It is recognized that there is some relation between the internal strength characteristic of an adhesive and its adhesive characteristics, particularly, its hold characteristic. Increased internal strength is generally recognized to have associated with it a related increase in the hold power of an adhesive. It is also generally recognized that the hold characteristic and tack or "quick stick" characteristic are counter-acting properties. That is, the enhancement of one to a great extent, when accomplished, is normally at the expense of the other.

In the electrical industry, electrical grade pressure-sensitive tapes are commonly used to hold wires as well as serve as an insulating barrier in the manufacture of coils, transformers and electric motors. The tapes become an integral and permanent part of the units. Heat curing pressure-sensitive adhesives are very widely used for this application. The adhesive is cured during the normal prebake cycle commonly used to rid the unit of moisture. During the subsequent varnish dip, wax dip, potting or encapsulating operation, a heat cured adhesive remains undissolved, thus providing a continuous bond and no contamination of the dip or potting compounds. Contamination can be a serious problem since it affects the drying and curing properties of the insulating materials and may ruin their properties. Accordingly, a normally tacky and pressure-sensitive adhesive which is resistant to attack by common varnish solvents would be highly useful as the adhesive component of electrical tapes.

In addition to the electrical industry, there are a large number of other industries where resistance to attack by solvents, oils and the like by an adhesive is most desirable. For example, in the aircraft industry and automobile industry there are many applications for adhesives wherein resistance to attack by solvents, oils, and the like, is essential.

Accordingly, it is an object of this invention to provide an adhesive having improved characteristics.

It is an additional object of this invention to provide a normally tacky and pressure-sensitive adhesive having improved characteristics of adhesion and in particular improved hold characteristics.

It is a further object of this invention to provide a normally tacky and pressure-sensitive adhesive having improved resistance to attack by common varnish solvents, oils, and the like, and improved high temperature stability.

Another object of this invention is to provide novel normally tacky and pressure-sensitive tapes utillizing novel adhesive compositions having the attributes set forth in the foregoing objects.

A further object of this invention is to provide novel methods for the manufacture of normally tacky and pressure-sensitive adhesives and adhesive tapes having the properties set forth in the foregoing objects.

Of the drawing:

FIG. 1 is a cross-sectional view of a pressure-sensitive adhesive tape formed in accordance with the present invention.

In accordance with this invention, pressure-sensitive adhesives having the aforementioned characteristics may be formed by mixing together an epoxy resin, a water-insoluble, curable elastomeric polymer having reactive groups capable of reacting with said epoxy resin referred to hereinafter as "epoxy-reactive elastomer," and a tackifier, which in certain instances may be the epoxy resin, to form an adhesive having normally tacky and pressure-sensitive characteristics. On curing the aforementioned adhesive for a sufficient period of time at an appropriate temperature there results a water-insoluble, normally tacky and pressure-sensitive adhesive having improved hold, solvent resistant and high temperature stability characteristics.

Any water-insoluble, rubbery, elastomeric polymer having reactive groups capable of reacting with an epoxy resin may be used as the epoxy-reactive elastomer. Preferably, the elastomeric polymer has reactive carboxylic groups although the reactive groups may be other than carboxylic such, for example, as amide, amine, bromine, chlorine, etc. Examples of suitable polymers are diene polymers and copolymers having reactive carboxylic groups such, for example, as carboxylic modified isoprene polymers, butadiene-styrene copolymers, polybutadiene and isobutylene-diene copolymers. Specific examples of polymers of the aforementioned type are as follows:

EPOXY-REACTIVE ELASTOMER A

A crude rubber which has 2.5% by weight combined maleic anhydride and 1.2% by weight uncombined maleic anhydride. This polymer has a Mooney viscosity of 50.

EPOXY-REACTIVE ELASTOMER B

A butyl rubber which has 1.0% by weight combined maleic anhydride and 1.2% by weight uncombined maleic anhydride. This copolymer has a Mooney viscosity of 30.

EPOXY-REACTIVE ELASTOMER C

A butadiene-styrene copolymer (75:25 monomer ratio) which is carboxylated 15% by weight and which has a Mooney viscosity of 50.

EPOXY-REACTIVE ELASTOMER D

A butadiene-acrylonitrile copolymer (medium high) which is carboxylated 2.5% by weight and which has a Mooney viscosity of 50–75. This copolymer is sold under the trade name "Hycar 1072."

EPOXY-REACTIVE ELASTOMER E

A liquid butadiene-acrylonitrile copolymer (medium high) containing carboxyl groups about 0.09 gram equivalents per 100 grams of copolymer. This copolymer has a Brookfield viscosity of about 100,000 cps. at room temperature. It is sold under the trade name "Hycar 1300–X-2."

If so desired, the adhesive mass of this invention may have incorporated therein modifying elastomeric polymers conventionally used in normally tacky and pressure-sensitive adhesives. Good results are obtained when the epoxy-reactive elastomer is in an amount at least about 10% by weight, and preferably at least about 25% by weight of the total elastomeric content. The term "total elastomeric content" includes all of the rubbery components, present in the adhesive.

Examples of suitable modifying, elastomeric polymers for this purpose are diene polymers such, for example, as isoprene polymer (natural rubber) and polybutadiene; diene-styrene and styrene homolog copolymers, such, for example, as a butadiene-styrene copolymer (75:25 monomer ratio) sold under the trade name "GRS 1022"; polybutadiene; isobutylene-diene copolymers such, for example, as a butadiene-acrylonitrile copolymer (medium high) having a Mooney viscosity of 47–50 which is sold under the trade name "Hycar 1022."

The epoxy resins used in this invention are formed by the reaction of a polyhydric alcohol or phenol with a halohydrin such, for example, as an epihalohydrin. Epoxy resins or ethers which may be used in accordance with this invention are exemplified by those disclosed in U.S. Patents 2,801,229, 2,735,829, 2,553,718 and 2,716,099.

Specific examples of typical epoxy resins used in accordance with this invention are as follows:

*Example A*

Bis-phenol is dissolved in epichlorhydrin in the proportion of 5130 parts (2.5 mols) of bis-phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to cool the exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction the excess epichlorhydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting glycidyl polyether of bis-phenol has a Durrans' mercury method softening point of 10° C., an average molecular weight of 360 ebullioscopic measurement in ethylene dichloride, and an epoxide value of 0.538 epoxy equivalent per 100 grams. It has an epoxide equivalent weight of 186 and a 1,2-epoxy equivalency of 1.93.

*Example B*

A solution is prepared by dissolving 2,2-bis (4-hydroxyphenyl)-propane in slightly aqueous epichlorhydrin in the proportion of 5,130 parts (22.5 mols) of the dihydric phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with effective agitation. The heating is discontinued as the temperature reaches 80° C. and cooling is started in order to remove exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene are added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting liquid glycidyl polyether of 2,2-bis (4-hydroxyphenyl) propane has the following properties:

| | |
|---|---|
| Durrans' melting point °C | 9 |
| Molecular weight | 370 |
| Epoxide value (epoxide equivalents per 100 grams) | 0.50 |
| Epoxide equivalent weight | 200 |
| Hydroxyl value (hydroxyl equivalents per 100 grams) | 0.08 |
| Percent chlorine | 0.46 |

The polyether contains 1.106 of the aromatic radicals therein. The 1,2-epoxy equivalency of the product is 1.85.

Example C

An epoxy ether resin is prepared by reacting 2.04 mols of epichlorhydrin with 1 mol of bis-(4-hydroxyphenyl)-2,2-propane (known to those skilled in the art as bis-phenol) in the presence of 2.14 mols of sodium hydroxide (5% excess). The resin is obtained by preparing a solution with 2280 parts of water, 245 parts of sodium hydroxide and 640 parts of bis-phenol. This solution in a reaction vessel fitted with a stirrer is heated to about 45° C. whereupon 530 parts of epichlorhydrin are rapidly added while agitating the reaction mixture. In about 50 minutes, the temperature of the reaction mixture, without application of external heat, rises to about 95° C. from the exothermic heat of reaction. As the resin is formed, the reaction mixture separates into a two phase system consisting of an aqueous phase and a molten taffy-like resin phase. About 80 minutes after the epichlorhydrin is added, the aqueous layer is removed and the molten resin is washed continuously with hot water until the wash water is neutral to litmus. Then the water is drained from the resin and the resin heated to about 140° C. with agitation until dry. The molten resin is cooled and flaked.

Example D

A solution consisting of 11.7 parts of water, 1.22 parts of sodium hydroxide, and 13.38 parts of bis-phenol is prepared by heating the mixture of ingredients to 70° C. and then cooling to 46° C. at which temperature 14.06 parts of epichlorhydrin are added while agitating the mixture. After 25 minutes has elapsed, there is added during an additional 15 minutes' time a solution consisting of 5.62 parts of sodium hydroxide in 11.7 parts of water. This causes the temperature to rise to 63° C. Washing with water at 20 to 30° C. temperature is started 30 minutes later and continues for 4½ hrs. The product is dried by heating to a final temperature of 140° C. in 80 minutes, and cooled rapidly. At room temperature, the product is an extremely viscous, semi-solid having a melting point of 27° C. by Durrans' mercury method and an epoxide equivalent weight of 246.

Commercial examples of typical epoxy resins useful in accordance with this invention are those sold under the trade names "Araldite 502," "Araldite 6005," "Araldite 6020" and "Araldite 6010"; those sold under the trade names "Bakelite 2795" and "Bakelite 3794"; those sold under the trade names "Epon 828," "Epon 834," "Epon 1001" and "Epon 1310," and those sold under the trade name "Epiphen" such, for example, as "Epiphen 851." The physical properties of the above mentioned epoxy resins are shown in the following Table I:

TABLE I

| Epoxy resin | Base phenol | Halohydrin | Viscosity, centipoises | Epoxy equivalent |
|---|---|---|---|---|
| "Araldite 502" | Bis phenol A | Epichlorhydrin | 4,500 | 0.38 |
| "Araldite 6005" | do | do | 10,500-17,000 | 0.51-.54 |
| "Araldite 6010" | do | do | 18,000 | 0.51 |
| "Araldite 6020" | do | do | 20,000-30,000 | 0.47-.495 |
| "Araldite 6060" | do | do | (¹) | 0.23 |
| "Bakelite 2795" | Bis phenol A about 10% reactive diluent | do | 500-900 | 0.54 |
| "Bakelite 3794" | Bis phenol A with a small amount of a trihydric phenol. | do | 7,000-19,000 | 0.57 |
| "Epon 828" | Bis phenol A | do | 13,500-19,500 | 0.51 |
| "Epon 834" | Polyhydric phenol | do | (²) | 0.39 |
| "Epiphen 851" | Novolac | do | 2,000-8,000 | 0.55 |

¹ M.P. 50-70° C. (Durrans). ² M.P. 27° C. (Durrans).

Further examples of epoxy resins used in this invention are those manufactured by reacting novalac resins and epihalohydrin such as epichlorohydrin. As well known to those skilled in the art, novalac resins are phenol-formaldehyde resins prepared by reacting less than one mole formaldehyde per mole of phenol. The novalac resins structurally resemble dihydroxy diphenyl methane and their chains are phenol ended. These resins are described in the "Chemistry of Phenolic Resins," book authored by Martin and published by Wiley & Sons, 1956, p. 87. Epoxidized novalac resins are disclosed in U.S. Patents 2,658,884, 2,658,885 and 2,716,099.

It has been found that whether or not a tackifier, in addition to the epoxy resin, is required in order to obtain the desired tackiness depends upon the particular water-insoluble epoxy-reactive elastomer that is reacted with the epoxy resin. When the elastomeric polymer is a butadiene-acrylonitrile copolymer having reactive carboxylic groups, the adhesive is rendered sufficiently tacky without the incorporation of an additional tackifier. Wherein the elastomeric polymer is a crude rubber, butyl rubber or butadiene-styrene copolymer having reactive carboxylic groups, a tackifier is usually incorporated in the adhesive to improve its tacky properties. When a tackifier is required, such tackifier should be compatible with the elastomeric polymer having reactive carboxylic groups.

Examples of suitable liquid tackifying resins for the purpose of this invention are liquid polyisobutylene resins, such as "Vistac No. 1," a broken chain butene resin;

liquid polyterpene resins, such as those polymers of beta pinene sold under the trade name "Piccolyte S.10" and "Piccolyte S.25"; liquid paracoumaroneindene resins; liquid rosin derivatives such as the triethylene glycol ester of hydrogenated resins sold under the trade name "Staybelite Ester No. 3," hydrogenated methyl ester of rosin, sold under the trade name "Hercolyn," technical hydroabietyl alcohol sold under the trade name "Abitol," and methyl ester of rosin sold under the trade name "Abalyn"; and liquid petroleum polymers such as the petroleum polymer sold under the trade name "Panapol."

Examples of solid tackifiers which may be used are rosin, hydrogenated rosin, dehydrogenated rosin, the glycols and glycerides of any of these resinous materials, polyterpenes, such as, for example, a solid polymer of beta pinene sold under the trade name "Piccolyte S.115," and coumarone-indene resins, polyalkyl styrenes, and oil-soluble phenol-aldehyde resins.

The adhesives of this invention may be free of or include, in conventional amounts, fillers such as magnesium carbonate, calcium carbonate, clay, titanium dioxide, hydrated alumina, pulverized glass, silica, etc. Other conventional ingredients for such formulations, such as anti-oxidants or heat stabilizers, dyes or pigments, plasticizers, etc., may be employed.

With respect to the proportions of the components used in accordance with this invention, the following comments are made. The epoxy resin should be in an amount sufficient to give adequate curing of the epoxy-reactive elastomer and be compatible with the elastomeric components of the adhesive. For convenience sake, the amounts of epoxy resin and tackifier, if any, employed will be expressed in parts per 100 parts of the total elastomeric components. As indicated hereinbefore, the term "total elastomeric components" includes the epoxy-reactive elastomer and any modifying elastomer, if any, which may be present; the epoxy-reactive elastomer being in any amount at least 10% by weight, and, preferably, at least 25% by weight of the total elastomeric components.

As indicated hereinbefore, the amount of epoxy resin and amount of epoxy resin and amount of tackifier, if any, that is used vary depending upon the particular epoxy-reactive elastomeric polymer that is employed. It has been found that epoxy resins are more compatible in epoxy-reactive diene-nitrile copolymers such, for example, as epoxy-reactive butadiene-acrylonitrile copolymers than the other epoxy-reactive elastomeric polymers disclosed herein. For this reason it is possible to employ high amounts of an epoxy resin in epoxy-reactive butadiene-acrylonitrile copolymer compositions so as to obtain the desired tackiness without having to incorporate an additional tackifier in the adhesive. In such compositions, wherein no additional tackifier is employed, other than the epoxy resin, it is preferred that the epoxy resin be liquid if the epoxy-reactive butadiene-acrylonitrile copolymer elastomer is solid. Alternatively, it is preferred that the epoxy resin be solid if the epoxy-reactive butadiene-acrylonitrile elastomer is liquid.

In the discussion that follows, the term "parts" means parts by weight.

In epoxy-reactive diene-nitrile copolymer compositions, the epoxy resin is generally in an amount from about 20 to 200 parts per 100 parts of the total elastomeric components. In solid elastomer-liquid epoxy compositions, the epoxy resin is generally in an amount from about 20 to 200 parts, and, preferably, about 40 to 125 parts, per 100 parts of the elastomeric components. In solid elastomer-solid epoxy compositions, the epoxy resin is generally in an amount from about 20–100 parts, and, preferably, about 30–60 parts, per 100 parts of the elastomeric components. In liquid elastomer-solid epoxy compositions, the epoxy resin is generally in an amount from about 20–150 parts, and preferably about 40–100 parts, per 100 parts of the elastomeric components.

As indicated hereinabove, with epoxy-reactive diene-nitrile copolymers of the aforedescribed type no additional tackifier is required in order that the adhesive be normally tacky and pressure-sensitive. To improve the tack of the adhesive, however, conventional solid or liquid tackifiers may be incorporated in the adhesive, in an amount from about 0 to 150 parts, and, preferably 5 to 100 parts, per 100 parts of total elastomeric components.

While epoxy resins are quite compatible in epoxy-reactive diene nitrile copolymers, they are not very compatible in epoxy-reactive diene polymers, epoxy-reactive isobutylene-diene copolymers or epoxy-reactive diene-styrene copolymers. Accordingly, in such compositions wherein the epoxy resin has low compatibility, it is generally in an amount from about 5 to 20 parts, and, preferably, 5 to 15 parts, per 100 parts of total elastomeric components. In such compositions, because of the low amounts of epoxy resin that can be incorporated and still be compatible, an additional tackifier is required in order to impart to the adhesive the desired normally tacky and pressure-sensitive characteristics. Generally, the tackifier, which may be any one of the known solid or liquid adhesive tackifiers, is incorporated in an amount from about 5 to 250 parts, and, preferably, 25 to 100 parts, per 100 parts of the elastomeric components.

In applying the adhesive to a backing different procedures may be used such as by solvent coating following a standard procedure and by calendering spreading. In applying the adhesive by solvent coating the following procedure is employed.

The adhesive is prepared by any conventional method. The epoxy-reactive elastomeric polymer, such as "Hycar 1072" and the reinforcing pigments, such as aluminum hydrate, are combined in a Banbury mixer to form a base and this is then put in an internal mixer wherein the epoxy resin is added slowly with mixing to blend it in. Finally, the adhesive is brought to a coating state by solvent addition employing a suitable aromatic or aliphatic solvent such as toluene. Then the adhesive mass is removed from the mixer and coated on a suitable backing, after which it is cured to the desired extent by heating the coated sheet in a suitable oven. If so desired, the reaction need not be complete so that further advance may occur upon heating the adhesive tape at the time of application.

If so desired, the adhesive may be applied to the backing by means of calendering. In this method the components are mixed together to form the adhesive after which the adhesive is spread on the backing.

It will be understood by those skilled in the field, the temperature for curing will vary depending upon many factors, such as (1) the reactivity of the particular epoxy resin used, (2) the time permitted for curing, (3) the particular epoxy-reactive elastomer being cured, and (4) the temperature at which the backing to which the adhesive is attached would be harmed. As the temperature of curing is increased, the required time for curing is decreased. For example, a one mil coat of an adhesive containing 100 parts of "Hycar 1072" and 100 parts of "Araldite 6005" can be cured effectively at room temperature in 4–6 days or at 300° F. in about two minutes or at 350° F. in about 30 seconds.

Table II, which follows, contains the formulations of various normally tacky and pressure-sensitive adhesives formed in accordance with this invention. Included in the formulations are varying amounts of (1) epoxy-reactive elastomeric polymers, (2) modifying elastomeric polymers, (3) tackifiers compatible with the elastomeric polymers in amounts to render the compositions tacky and pressure-sensitive at normal temperature, and (4) epoxy resins in amounts sufficient to produce adhesives which have good hold characteristic and which are insoluble in conventional aromatic and aliphatic solvent as well as exhibiting good high temperature stability.

TABLE II

|  | I | II | III | IV | V | VI | VII | VIII | IX | X | XI | XII | XIII |
|---|---|---|---|---|---|---|---|---|---|---|---|---|---|
| Epoxy-reactive elastomer D | 100 | | | | | | | 40 | 50 | 50 | 25 | 25 | |
| Epoxy-reactive elastomer A | | 100 | | | 33 | | | | | | | | |
| Epoxy-reactive elastomer B | | | 100 | | | 50 | | | | | | | |
| Epoxy-reactive elastomer C | | | | 100 | | | 50 | | | | | | |
| Epoxy-reactive elastomer E | | | | | | | | | | | 25 | 25 | 50 |
| "Araldite 6005" | 100 | 10 | 10 | 10 | 8 | 20 | 20 | 100 | 75 | | | | |
| "Araldite 6060" | | | | | | | | 50 | 50 | 35 | 40 | 20 | 50 |
| "Hycar 1022" | | | | | | | | 60 | 50 | | | | |
| "Piccolyte S. 115" | | | 50 | 50 | 50 | | 50 | 50 | | | | | |
| "GRS-1022" | | | | | 67 | 50 | | | | | | | |
| "Staybelite ester No. 10" | | | | | 75 | | 60 | | | | | | |
| Zinc resinate | | | | | 8 | | 10 | 15 | | | | | |
| Crude rubber | | | | | | | | 50 | | | | | |
| Dioctyl phthalate | | | | | | | | | | | 10 | | |

In the formation of pressure-sensitive adhesive tapes employing the improved adhesives of this invention the adhesive 2 (see the accompanying drawing) may be applied in a suitable manner, such as by solvent coating or calendering discussed hereinbefore in detail to any conventional backing 1 for such tapes such as paper, cloth, non-fibrous films (e.g., cellophane, vinyl resins, polyethylene terephthalates) etc. For example, suitable tapes may be prepared by solvent coating each of the adhesive masses shown in the foregoing table on a 27 pound paper (24 x 36 x 480) impregnated 85% of its weight with an impregnant [75 parts "Hycar OR 25" and 25 parts G.R.S. (50 butadiene:50 styrene)] at a coating weight of 1.5 ounces sq. yd. The adhesive on the resulting tape is then cured by storing the tape for six days at room temperature.

In general, the adhesive is coated at a coating weight in the range of 5 to 3.0 oz. sq. yd., and, preferably in the range of 1.0 to 2.0 oz./sq. yd.

The invention in its broader aspects is not limited to the specific steps, methods, compositions, combinations and improvements shown and described but departures may be made therefrom within the scope of the accompanying claims without departing from the principles of the invention and without sacrificing its chief advantages.

What is claimed is:

1. A normally tacky and pressure-sensitive adhesive tape comprising a flexible backing having coated on at least one major surface a normally tacky and pressure-sensitive adhesive composition consisting essentially of: (1) a liquid epoxy resin formed by the reaction of a compound selected from the group consisting of a polyhydric alcohol and a polyhydric phenol with a halohydrin, and (2) elastomeric components consisting of: (a) a water-insoluble solid elastomeric polymer having carboxylic groups capable of reacting with said liquid epoxy resin, said elastomeric polymer being selected from the group consisting of carboxylic modified diene homopolymer elastomers and carboxylic modified diene copolymer elastomers wherein a diene monomer is the principal component, and (b) a modifying elastomer selected from the group consisting of diene homopolymer elastomers and diene copolymer elastomers wherein a diene monomer is the principal component, said modifying elastomer being in an amount of from 0 to 90% by weight of the total elastomeric components, the liquid epoxy resin being in an amount from about 5 to 125 parts per 100 parts of total elastomeric components with the epoxy resin being in an amount up to 20 parts when the elastomeric polymer is other than a diene-nitrile copolymer, and the adhesive composition including a tackifying component which is an agent selected from the group consisting of (1) the aforementioned liquid epoxy resin in an amount of at least 40 parts per 100 parts of total elastomeric components and used as the tackifier for an elastomeric polymer of the diene-nitrile type and (2) a combination of the aforementioned liquid epoxy resin in an amount of at least 5 parts per 100 parts of total elastomeric components and a tackifying resin compatible with the elastomeric polymer in an amount from about 5 to 250 parts per 100 parts of total elastomeric components.

2. The normally tacky and pressure-sensitive adhesive tape of claim 1 wherein the elastomeric polymer is a butadiene-acrylonitrile copolymer having carboxylic groups.

3. The normally tacky and pressure-sensitive adhesive tape of claim 1 wherein the elastomeric polymer is a butadiene-styrene copolymer having carboxylic groups, and wherein there is incorporated a tackifier compatible with said butadiene-styrene copolymer.

4. The normally tacky and pressure-sensitive adhesive tape of claim 1 wherein the elastomeric polymer is an isobutylenediene copolymer having carboxylic groups, and wherein there is incorporated a tackifier compatible with said isobutylenediene copolymer.

5. The normally tacky and pressure-sensitive adhesive tape of claim 1 wherein the elastomeric polymer is an isoprene polymer having carboxylic groups, and wherein there is incorporated a tackifier compatible with said isoprene polymer.

6. The normally tacky and pressure-sensitive adhesive tape according to claim 1, wherein the water-insoluble solid elastomer having carboxylic groups is in an amount of at least 25% by weight of the total elastomeric components.

References Cited in the file of this patent

UNITED STATES PATENTS

| 2,879,252 | Been et al. | Mar. 24, 1959 |
| 2,915,494 | Snodden | Dec. 1, 1959 |
| 2,947,338 | Reid et al. | Aug. 2, 1960 |

FOREIGN PATENTS

| 1,149,324 | France | Dec. 24, 1957 |